US007751493B2

(12) United States Patent
Niu et al.

(10) Patent No.: US 7,751,493 B2
(45) Date of Patent: Jul. 6, 2010

(54) METHOD FOR RATE ADAPTATION WITH EXTENDED MCS SET FOR WIDEBAND EIGEN-BEAMFORMING TRANSMISSION

(75) Inventors: Huaning Niu, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 891 days.

(21) Appl. No.: 11/317,826

(22) Filed: Dec. 22, 2005

(65) Prior Publication Data

US 2007/0147535 A1 Jun. 28, 2007

(51) Int. Cl.
*H04B 7/02* (2006.01)
*H04L 1/02* (2006.01)

(52) U.S. Cl. .................. 375/267; 375/260; 370/335; 370/342; 455/67.13; 455/452.2; 455/59; 455/115

(58) Field of Classification Search ............. 375/267, 375/260; 370/335, 342; 455/67.13, 452.2, 455/59, 115
See application file for complete search history.

(56) References Cited

U.S. PATENT DOCUMENTS

| | | | |
|---|---|---|---|
| 7,120,199 B2 | 10/2006 | Thielecke et al. | |
| 7,184,713 B2 | 2/2007 | Kadous et al. | |
| 7,242,724 B2 | 7/2007 | Alexiou et al. | |
| 7,263,132 B2 | 8/2007 | Horng et al. | |
| 7,327,795 B2 | 2/2008 | Oprea | |
| 7,379,492 B2 | 5/2008 | Hwang | |
| 2003/0123598 A1 | 7/2003 | Gollamudi et al. | |
| 2003/0236080 A1* | 12/2003 | Kadous et al. | ........... 455/226.1 |
| 2005/0237971 A1 | 10/2005 | Skraparlis | |
| 2006/0114858 A1* | 6/2006 | Walton et al. | ................ 370/335 |
| 2006/0221920 A1 | 10/2006 | Gopalakrishnan et al. | |
| 2007/0140363 A1 | 6/2007 | Horng et al. | |

OTHER PUBLICATIONS

Mujtaba, S.A. "TGn Sync Proposal Technical Specification", Nov. 4th, 2004, IEEE 802.11 TGn, IEEE 802.11-04/889r1.*
Doan, L. H., "Hierarchical Subgroup Power and Modulation Coding Adaptation-A New Frequency-Space Link Adaptation Scheme in MIMO-OFDM Eigenmode Adaptive Transmission System", Jun. 2005, Vehicular Technology Conference 2005, vol. 1 p. 668-672.*

(Continued)

*Primary Examiner*—Mohammad H Ghayour
*Assistant Examiner*—Sung Ahn
(74) *Attorney, Agent, or Firm*—Kenneth L. Sherman, Esq.; Michael Zarrabian, Esq.; Myers Andras Sherman LLP (57) ABSTRACT

A method for rate adaptation with extended MCS set for wideband eigen-beamforming transmission. A signaling method over multiple channels in a wireless telecommunication system including a transmitter and a receiver, performs the steps of obtaining an information bit stream, selecting the number of transmission streams, selecting different transmission rates for each MIMO OFDM transmission, and transmitting the information bit stream from the transmitter via said multiple channels over a plurality of transmitter antennas to the receiver according to the selected transmission rate per channel. Selecting transmission rates further includes the steps of selecting the transmission rates based on the diversity order of each stream. The method selects different transmission modes for each MIMO OFDM transmission and provides a simple, fast and efficient scheme to select the transmission rate for each eigen-mode transmission.

26 Claims, 7 Drawing Sheets

OTHER PUBLICATIONS

Mujtabe, S. A., "TGn Sync Proposal Technical Specification", Jul. 2005, IEEE 802.11 TGn, IEEE 802.11-04/0889r7.*

G. Holland, N. Vaidya and P. Bahl, "A rate adaptive MAC protocol for multi-hop wireless networks," ACM/IEEE Int. Conf. on Mobile Computing and Networking (Mobicom'01), Rome, Italy, Jul. 2001.

Z. Lin and G. Malmgren and J. Torsner, "System performance analysis of link adaptation in HiperLan Type 2," Proc. IEEE Vehicular Technology Conference, May 2000, vol. 4, pp. 1719-1725.

Mujtaba, S.A., "TGn Sync Proposal Technical Specification," a contribution to doc.: IEEE 802.11-04/889r0, Aug. 2004, pp. 1-138, U.S.

Shiu, Da-Shan, Foschini, G.J., Gans, M.J., and Kahn, J.M., "Fading Correlation and its Effect on the Capacity of Multielement Antenna Systems," IEEE Trans. Communication, pp. 502-513, Mar. 2000, vol. 48, No. 3, U.S.

G. Foschini, "Layered space-time architecture for wireless communication in a fading environment when using multi-element antennas," Bell Labs Tech. J., 1996, pp. 41-59, vol. 1, No. 2, U.S.

V. Tarokh, N. Seshadri and A.R. Calderbank, "Space-time codes for high data rate wireless communication: Performance criterion and code construction", IEEE Trans. On Information Theory, Mar. 1998, pp. 744-765.vol. 44, No. 2, U.S.

L. Zheng and D. Tse, "Diversity and Multiplexing: A Fundamental Tradeoff In Multiple-Antenna Channels,"IEEE Trans. Info. Theory, May 2003, pp. 1073-1096, vol. 49, No. 2, U.S.

U.S. Office Action for U.S. Appl. No. 11/313,359 mailed Apr. 7, 2009.

U.S. Office Action for U.S. Appl. No. 11/313,359 mailed Sep. 30, 2008.

U.S. Office Action for U.S. Appl. No. 11/317,058 mailed Jan. 8, 2009.

Mujtaba, S.A., "TGn Sync Proposal Technical Specification," doc.: IEEE 802.11-04/0889r6, May 2005, pp. 1-131, United States.

U.S. Notice of Allowance mailed Aug. 28, 2009, for U.S. Appl. No. 11/317,058.

U.S. Notice of Allowance mailed Oct. 5, 2009, for U.S. Appl. No. 11/317,058.

* cited by examiner

Fig. 5

METHOD FOR RATE ADAPTATION WITH EXTENDED MCS SET FOR WIDEBAND EIGEN-BEAMFORMING TRANSMISSION

FIELD OF THE INVENTION

The present invention relates generally to data communication, and more particularly, to data communication in multi-channel communication system such as multiple-input multiple-output (MIMO) systems.

BACKGROUND OF THE INVENTION

A multiple-input-multiple-output (MIMO) communication system employs multiple transmit antennas in a transmitter and multiple receive antennas in a receiver for data transmission. A MIMO channel formed by the transmit and receive antennas may be decomposed into independent channels, wherein each channel is a spatial sub-channel (or a transmission channel) of the MIMO channel and corresponds to a dimension. The MIMO system can provide improved performance (e.g., increased transmission capacity) if the additional dimensionalities created by the multiple transmit and receive antennas are utilized.

MIMO increases system link robustness and spectral efficiency. To optimize spectral efficiency for MIMO system, many efforts have been made, which can be broadly classified into two categorists: open-loop approaches and closed-loop approaches. The open-loop approaches include spatial multiplexing, space-time coding and the tradeoff between them. The closed-loop approaches focus on maximizing the link capacity, which results in a "water-filling" solution, and on minimizing the weighted MMSE which provides an "inverse water-filling" solution.

In an open-loop MIMO system, the MIMO transmitter has no prior knowledge of the channel condition (i.e., channel state information). As such, space-time coding techniques are usually implemented in the transmitter to combat fading channels. In a closed-loop system, the channel state information (CSI) can be fed back to the transmitter from the receiver, wherein some pre-processing can be performed at the transmitter in order to separate the transmitted data streams at the receiver side.

Such techniques are referred to as beamforming techniques, which provide better performance in desired receiver's directions and suppress the transmit power in other directions. Beamforming techniques are considered for IEEE 802.11n (high throughput WLAN) standard. Closed-loop eigen-beamforming generally provides higher system capacity compared with the closed-loop solution, assuming the transmitter knows the down-link channel. Singular value decomposition (SVD) based eigen-beamforming decomposes the correlated MIMO channel into multiple parallel pipes.

Figure 1:
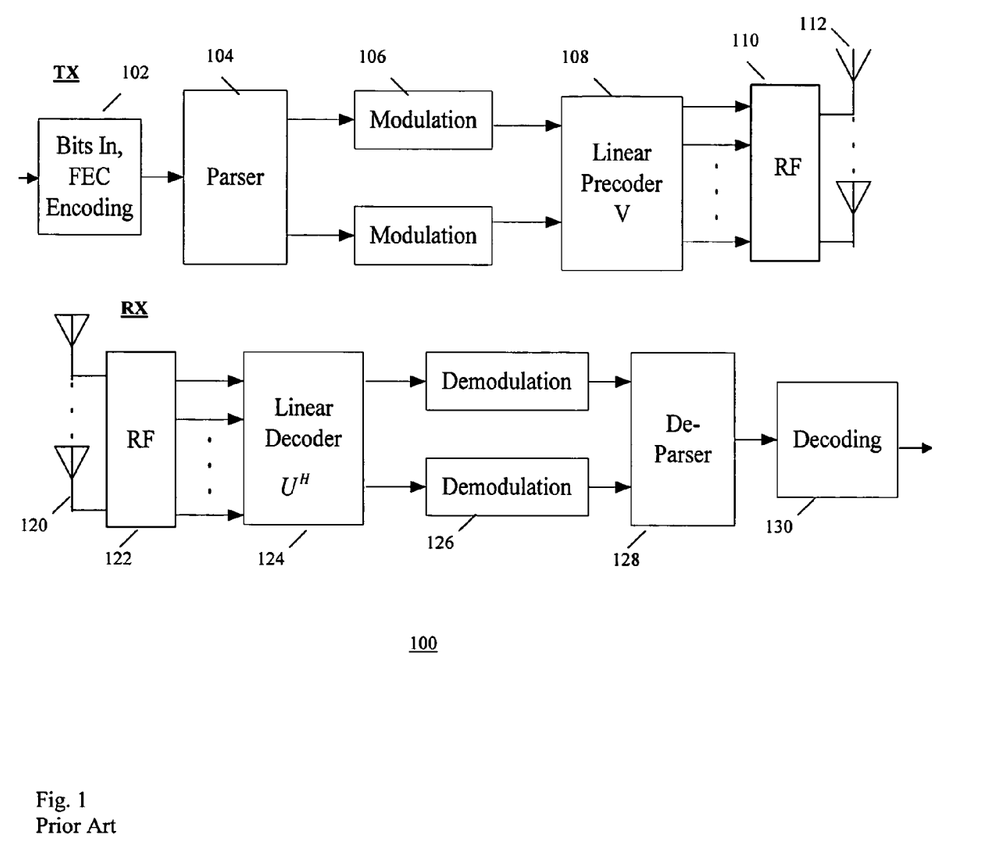
FIG. 1 shows a block diagram of a conventional SVD beamforming MIMO system.

In steered data transmission, the basic principle of the singular value decomposition (SVD)-based eigen-beamforming decomposes the correlated MIMO channel into multiple parallel pipes. FIG. 1 shows a MIMO wireless communication system 100 comprising a transmitter TX and a receiver RX. The transmitter TX includes an FEC (forward error correction) encoder 102 that encodes an input bit stream, a parser 104 that generates $N_{ss}$ number of spatial data streams, $N_{ss}$ number of modulators 106, linear precoder (V) 108 that generates $N_t$ transmit streams, RF unit 110 and $N_t$ transmit antennas 112.

In the unit 102 the source bit stream is encoded by a channel encoder and a puncturer punctures the bits to change the coding rate. The spatial parser 104 separates the data stream into several (one or more) spatial streams. The constellation mapper 106 groups/maps the bits into symbols using a Gray Mapping Rule. The precoder 108 provides steering of the packet using V matrix. In the RF modulator 110, the signal is RF modulated and transmitted through the strongest channel via the transmit antennas 112.

The receiver RX includes $N_r$ receive antennas 120, RF unit 122 that generates $N_r$ received streams, a linear decoder ($U^H$) 124 that generates $N_{ss}$ data streams, $N_{ss}$ demodulators 126 ($N_{ss}$ output streams), de-parser 128 and a decoder 130.

In the receiver RX, the receiving antennas 120 receive the signals, and the received signals are sampled and down-converted to base-band digital signal in the unit 122. The decoder 124 performs linear MIMO detection. The multiple demodulators 126 perform constellation de-mapping that demap the constellation point to soft bit information. The deparser 128 de-multiplexes multiple data streams back to one stream for Viterbi decoding. And, the decoder 130 performs the Viterbi decoding.

Considering the MIMO system transmits $N_{ss}$ number of data streams with $N_t$ transmit antennas and $N_r$ receive antennas ($N_{ss} \leq \min(N_r, N_t)$), as shown in FIG. 1, then the received signal y at the receiver can be represented as:

$$y = HVx + n \qquad (1)$$

wherein x is the $N_{ss} \times 1$ transmitted signal vector, V is the $N_t \times N_{ss}$ right singular value matrix corresponding to the $N_{ss}$ largest eigen-values, H is a $N_r \times N_t$ channel response which can be factored using SVD such that $H = UDV^H$, and n is $N_r \times 1$ additive noise vector in the channel.

The system in FIG. 1 does not specify how to choose the coding and modulation to transmit. As shown in FIG. 1, in the transmitter TX the information bit stream is first parsed into $N_{ss}$ streams by the parser 104. At the receiver RX, the received signal y is multiplied by the left singular value matrix $U^H$ in the linear decoder 124, wherein the received signal after such processing, $X_p$, can be represented as:

$$X_p = U^H y = Dx + U^H n. \qquad (2)$$

To achieve link capacity, eigen-beamforming requires changing the coding and modulation on subcarrier basis, which gives the so-called water-filling solution. However, the complexity is very high for practical implementation. In order to simplify the complexity, several systems have been proposed including adapting coding/modulation across all sub-carrier.

In rate adaptation, the mechanism to select one of the multiple available transmission rates at a given time is referred to as link adaptation, rate adaptation, or MCS (modulation coding scheme) adaptation. The effectiveness of the implemented link adaptation scheme can affect the system performance significantly.

Current IEEE 802.11a PHY has 8 transmission rates for rate adaptation. Some proprietary link adaptation schemes have been proposed for WLAN recently. In one case, a receiver-based auto-rate scheme based on the RTS/CTS mechanism is proposed by modifying the IEEE 802.11 standard. The basic idea is: first the receiver estimates the wireless channel quality using a sample of the instantaneous received channel strength at the end of the RTS (Request-To-Send) reception, then select the appropriate transmission rate based on this estimate and feeds back to the transmitter using CTS (Clear-To-Send). In another case, the C/I (carrier to interference ratio) is used as the wireless link quality measurement. All these link adaptation schemes make PHY mode selection based on some pre-computed PHY mode tables corresponding to the link quality measurement. The table is manageable with 8 transmission modes in the current IEEE 802.11a standard.

However, for IEEE 802.11n MIMO-OFDM (orthogonal frequency-division multiplexing) transmission, 126 transmission modes are defined (see S. A. Mujtaba, "TGn Sync Proposal Technical Specification," a contribution to IEEE 802.11, 11-04-889r7, July 2005, incorporated herein by reference), to fully explore the MIMO wireless channel variation wherein multiple transmission modes are defined for the same transmission rate. In this case, rate selection becomes more complicated. Using similar rate table as in IEEE 802.11a is no longer feasible. As such, there is need for a new way of rate adaptation for MIMO eigen-beamforming.

BRIEF SUMMARY OF THE INVENTION

In one embodiment the present invention provides signaling method over multiple channels in a wireless telecommunication system including a transmitter and a receiver, comprising the steps of obtaining an information bit stream, selecting the number of transmission streams, selecting different transmission rates for each MIMO OFDM transmission, and transmitting the information bit stream from the transmitter via said multiple channels over a plurality of transmitter antennas to the receiver according to the selected transmission rate per channel.

Selecting transmission rates further includes the steps of selecting the transmission rates based on the diversity order of each stream. In one implementation, selecting transmission rates further includes the steps of computing a transmission rate table for SISO (single input, single output) AWGN (additive white gaussian noise) channel, determining the average power, and performing back-off for the SNR requirement corresponding to the diversity order. The steps of determining the average power further comprises the steps of determining the mean value of the eigen-values for each eigen-mode. The system includes $N_{tx}$ transmit antennas and $N_{rx}$ receive antennas, and the diversity gain of each eigen-mode transmission in beamforming is given by diversity order $(N_{tx}-i)(N_{rx}-i)$, where $i=0, \ldots, \min(N_{tx}, N_{rx})-1$ are the indices corresponding to largest eigen-mode to smallest eigen-mode.

In addition, selecting transmission rates further includes the steps of using the diversity order of each stream to select the corresponding transmission rate for each eigen-mode. The power of each eigen-mode transmission is calculated based on the corresponding eigen-values. As such, different transmission modes for each MIMO-OFDM transmission are used in rate adaptation with extended MCS set for wideband eigen-beamforming transmission. Accordingly, the present invention provides a simple, fast and efficient scheme to select different transmission modes for each MIMO OFDM transmission, providing a transmission rate for each eigen-mode.

In another aspect the present invention provides a communication system which implements the steps of the method of the present invention.

These and other features, aspects and advantages of the present invention will become understood with reference to the following description, appended claims and accompanying figures.

DETAILED DESCRIPTION OF THE INVENTION

Figure 2:
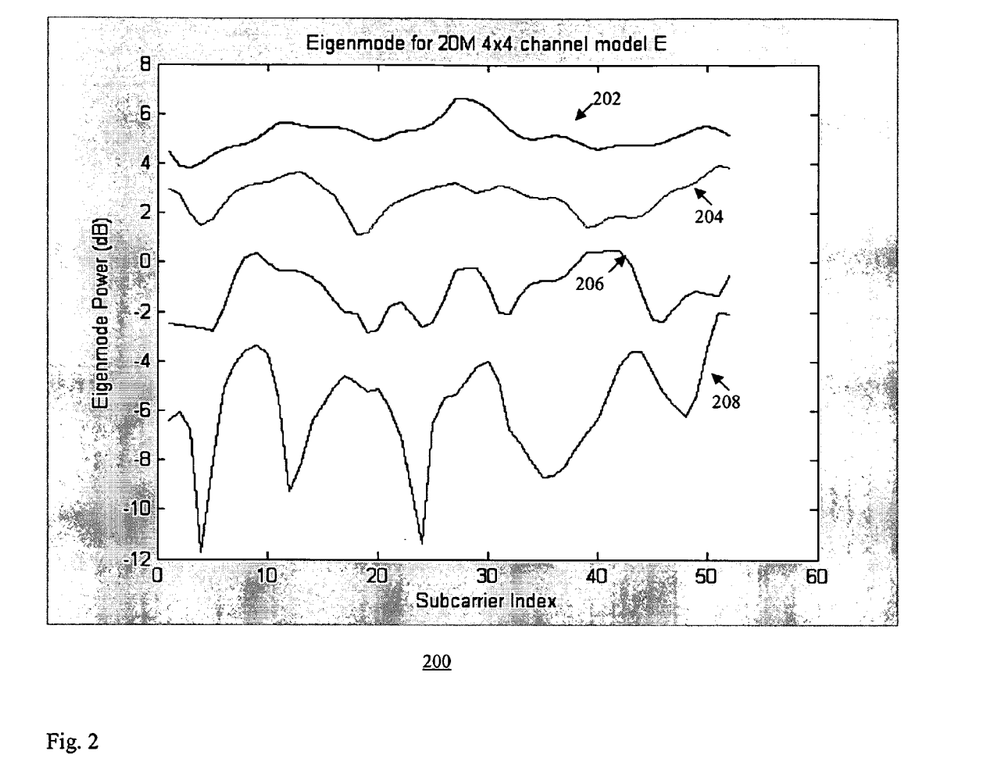
FIG. 2 shows an example eigen-mode power distribution of 4×4 (i.e., 4 transmit antennas, 4 receive antennas) IEEE 802.11n channel model E with 0.5λ antenna spacing.
Figure 3:
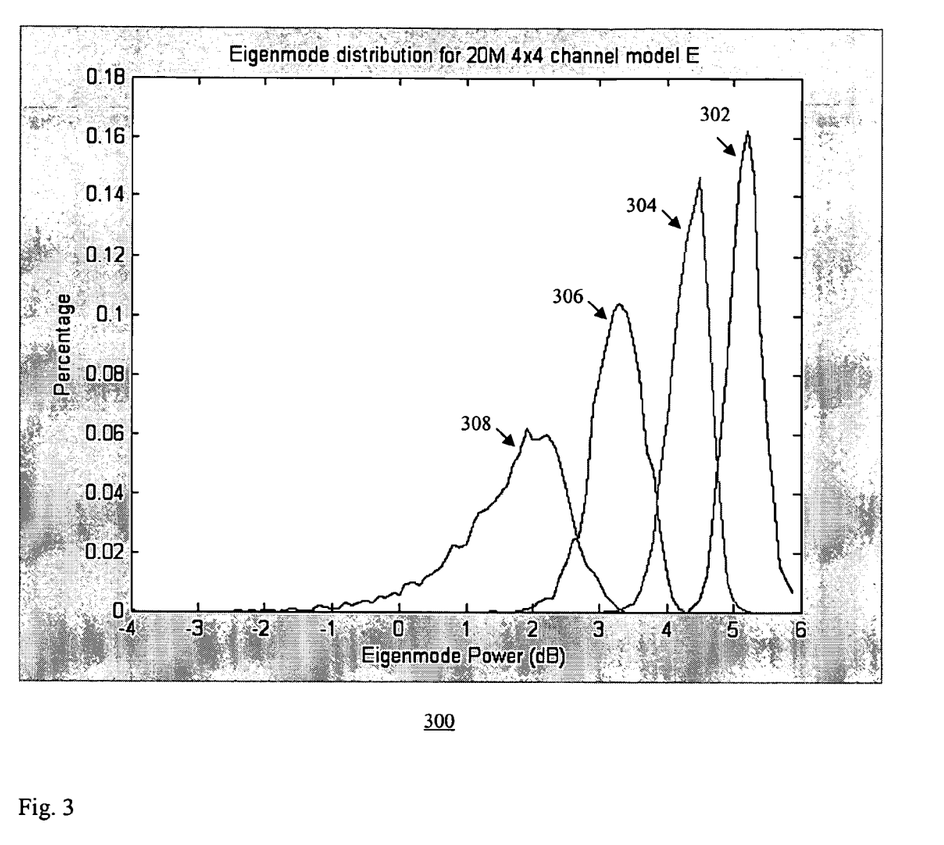
FIG. 3 shows a PDF of eigen-mode power of 4×4 IEEE 802.11n channel model E with 0.5λ antenna spacing.

The SVD based eigen-beamforming decomposes the correlated MIMO channel into multiple parallel pipes as shown by relation (2) above. The signal to noise ratio (SNR) associated with each of the eigen-modes is directly proportional to their eigen-values. FIG. 2 shows a set 200 of curves (graphs) representing a snap shot of eigen-mode power distribution for a typical 4×4 IEEE 802.11n channel model E. The x-axis (horizontal) represents the different OFDM tones, the y-axis represents the power level of each eigen-mode. The curve 202 shows the power level of the first eigen-mode across all OFDM tones. Since the first eigen-mode has high diversity order (diversity order=16), it is fairly flat over different OFDM tones. The curves 204, 206 and 208 correspond to the power of the second, third and the fourth eigen-mode, respectively. Since the forth eigen-mode has the lowest diversity order (diversity order=1), it shows the most significant power fluctuation. FIG. 2 is a typical eigen-mode power distribution of 4×4 IEEE 802.11n channel model E with 0.5λ antenna spacing. Furthermore, the set 300 in FIG. 3 shows the pdf (probability density function) of the eigen-value distribution by averaging over 1000 channel realizations. The x-axis represents the power level of each eigen-mode and the y-axis represents probability distribution of the power. The curve 302 shows the power distribution of the first eigen-mode. Since the first eigen-mode has high diversity order (diversity order=16), its power does not fluctuate much over different OFDM tones. Therefore, the curve 302 looks sharp in FIG. 3. The curves 304, 306, 308 correspond to the power distribution of the second, third and the fourth eigen-mode, respectively. Since the forth eigen-mode has the lowest diversity order (diversity order=1), it shows the most significant power fluctuation over different OFDM tones, therefore, the curve is less sharp and spanned over large range of power. FIG. 3 shows a pdf of eigen-mode power of 4×4 IEEE802.11n channel model E with 0.5λ antenna spacing. The large valued eigen-modes have high diversity order, where the power is concentrated and the spectrum is flat. However, for the eigen-modes with small eigen-values, severe frequency selectivity exists.

In one embodiment the present invention provides a method for rate adaptation with extended MCS set for wideband eigen-beamforming transmission. To explore the higher diversity order for larger eigen-modes, in one embodiment the present invention provides a rate selection algorithm based on the following Theorem.

Definition: Diversity Gain: For average error probability $P_e(SNR)$, a scheme is said to achieve diversity gain d if relation (3) below is true:

$$\lim_{SNR \to \infty} \frac{\log P_e(SNR)}{\log(SNR)} = -d \tag{3}$$

The error probability $P_e(SNR)$ is averaged over the additive noise n, the channel matrix H, and the transmitted codewords (assumed equally likely). This definition of diversity gain differs from the standard definition in space-time coding literature.

Theorem: For a MIMO transmission system with $N_{tx}$ transmit antennas and $N_{rx}$ receive antennas, the diversity gain of each eigen-mode in beamforming is given by diversity order $(N_{tx}-i)(N_{rx}-i)$, where $i=0, \ldots, \min(N_{tx}, N_{rx})-1$ are the indices corresponding to the largest eigen-mode to the smallest eigen-mode.

For example, when $N_{rx}=4$ and $N_{tx}=4$, the four eigen-mode transmissions have diversity order of 16, 9, 4, 1, respectively. In another example where $N_{rx}=2$ and $N_{tx}=4$, the two eigen-mode transmissions have diversity order of 8 and 3, respectively.

Based on the diversity order of each stream, the corresponding transmission rate for each eigen-mode is selected according to the present invention. The basic method involves computing the transmission rate table for SISO (single input, single output) AWGN (additive white gaussian noise) channel, and computing the average power across all OFDM tones (e.g., mean value of the eigen-values for each eigen-mode). Then, performing back-off for the SNR requirement (i.e., calculating the equivalent SNR, defined further below) corresponding to the diversity order (e.g., step 404 in FIG. 4C). The equivalent SNR is used for rate selection.

Figure 4A:
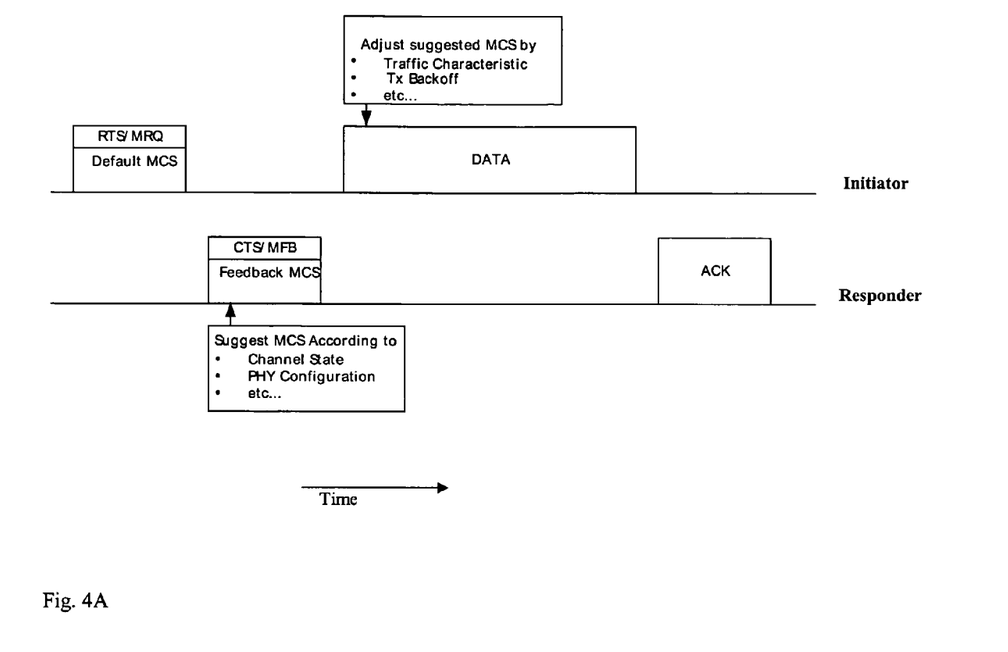
FIG. 4A shows closed-loop rate adaptation message exchange diagram.

FIG. 4A shows a closed-loop rate adaptation message exchange event diagram for calculation of the MCS in CTS/MFB when beamforming is used by an initiator and a responder.

Figure 4B:
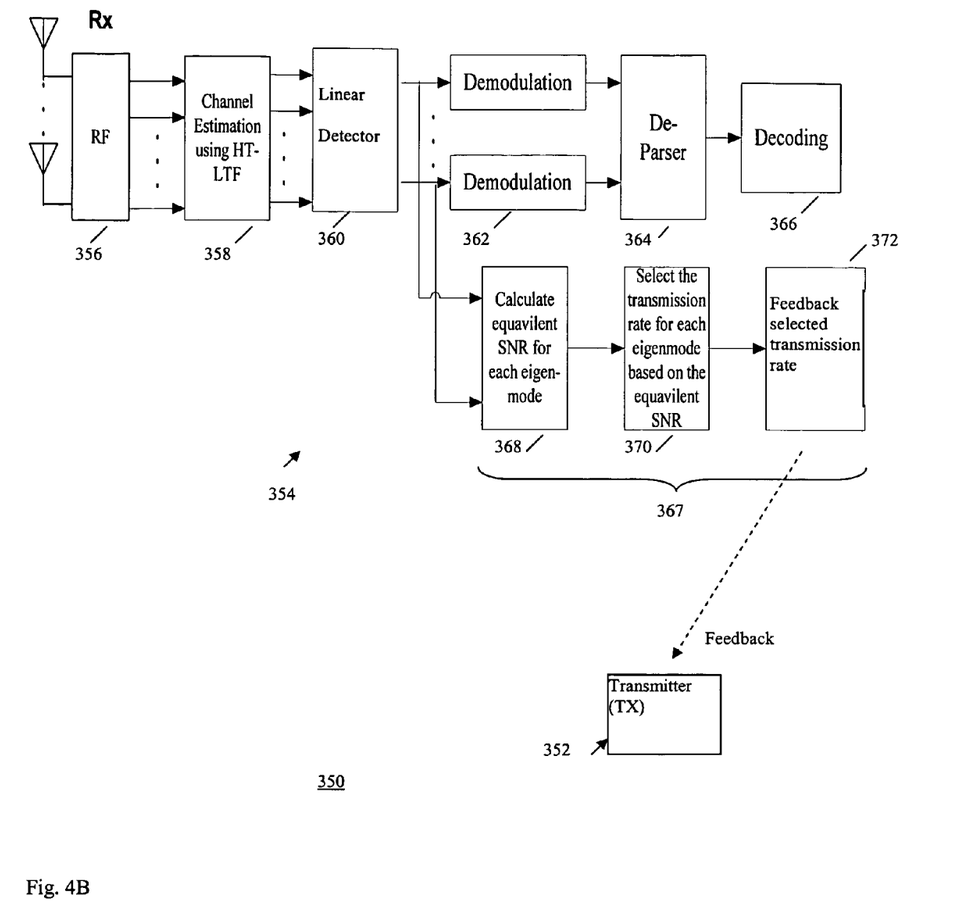
FIG. 4B shows a block diagram of an example wireless system including a transmitter and a receiver according to an embodiment of the present invention.

FIG. 4B shows a block diagram of an example wireless system 350 including a transmitter 352 and a receiver 354 according to an embodiment of the present invention. The transmitter 352 can be as described in relation to FIG. 1. The receiver 354 comprises, according to an embodiment of the present invention: RF unit 356, channel estimator 358 that estimates the channel using HT-LTF, a linear decoder 360 that performs linear decoding, demodulators 362, de-parser 364, and decoder 366. The receiver 354 further includes a controller (i.e., rate adaptation module) 367 comprising a equivalent SNR calculator 368 that calculates the equivalent SNR for each eigen-mode, a selector 370 that selects the transmission rate for each eigen-mode based on the equivalent SNR, and feed back unit 372 that feeds back the selected transmission rate to the transmitter 352. The receiver 354 implements the method of FIG. 4C below.

Figure 4C:
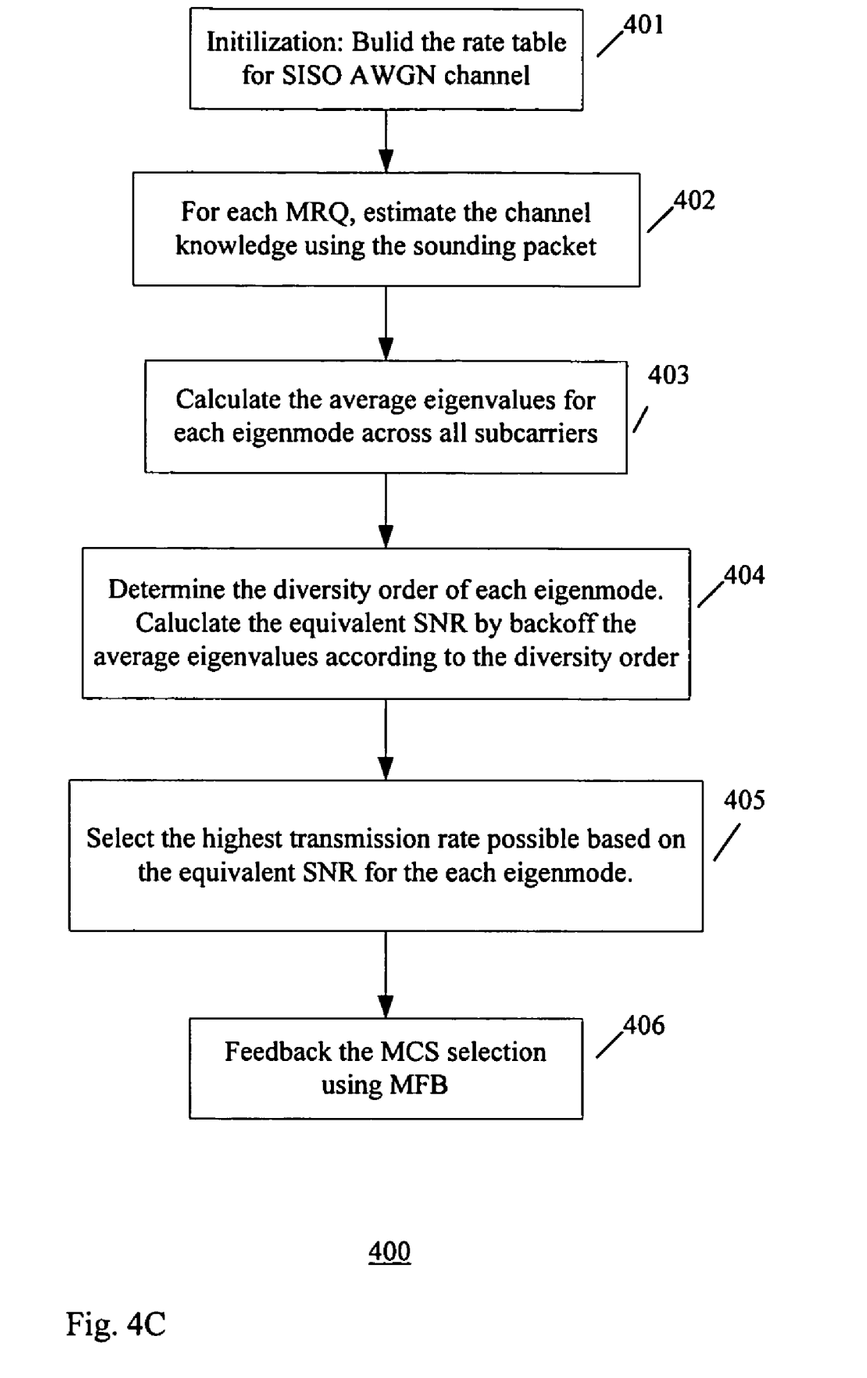
FIG. 4C is a flowchart of example steps of MCS selection in a SVD beamforming MIMO wireless communication system according to an embodiment of the present invention.

FIG. 4C shows an example flowchart 400 of the steps of using the diversity order of each stream, to select the corresponding transmission rate for each eigen-mode according to an embodiment of the present invention, including the steps of:

Step 401: Initialization: build the rate table for SISO AWGN channel. The example table is shown in Table I, which is based on simulation. The table is pre-computed and does not require update during transmission.

TABLE 1

Required SNR for different MCS in AWGN channels

| Constellation Size | Code Rate | SNR for 1% PER in SISO AWGN (dB) | SNR for 10% PER in SISO AWGN (dB) |
|---|---|---|---|
| BPSK | 1/2 | 1.0 | 0.3 |
| QPSK | 1/2 | 4.0 | 3.3 |
| QPSK | 3/4 | 6.6 | 5.7 |
| 16 QAM | 1/2 | 9.7 | 8.9 |
| 16 QAM | 3/4 | 13.0 | 12.1 |
| 64 QAM | 1/2 | 14.7 | 13.7 |
| 64 QAM | 2/3 | 17.3 | 16.3 |
| 64 QAM | 3/4 | 18.7 | 17.6 |
| 64 QAM | 5/6 | 20.0 | 19.0 |
| 256 QAM | 1/2 | 19.2 | 17.9 |
| 256 QAM | 3/4 | 24.2 | 23.0 |

Step 402: Estimate the channel state information in estimator 358. As shown in FIG. 4A, MRQ (MCS request) is a MAC (media access control) control message which is sent by the initiator (FIG. 4A) to the responder to request suggested transmission mode from the responder. MRQ is sent using a sounding packet. The responder needs the estimate of the channel state information using the preamble of the sounding packet.

Step 403: Calculate the eigen-values using the estimated channel state information. The eigen-values can be calculated using either SVD decomposition or a UD decomposition. Calculate the average power of each eigen-mode across all subcarriers.

Figure 5:
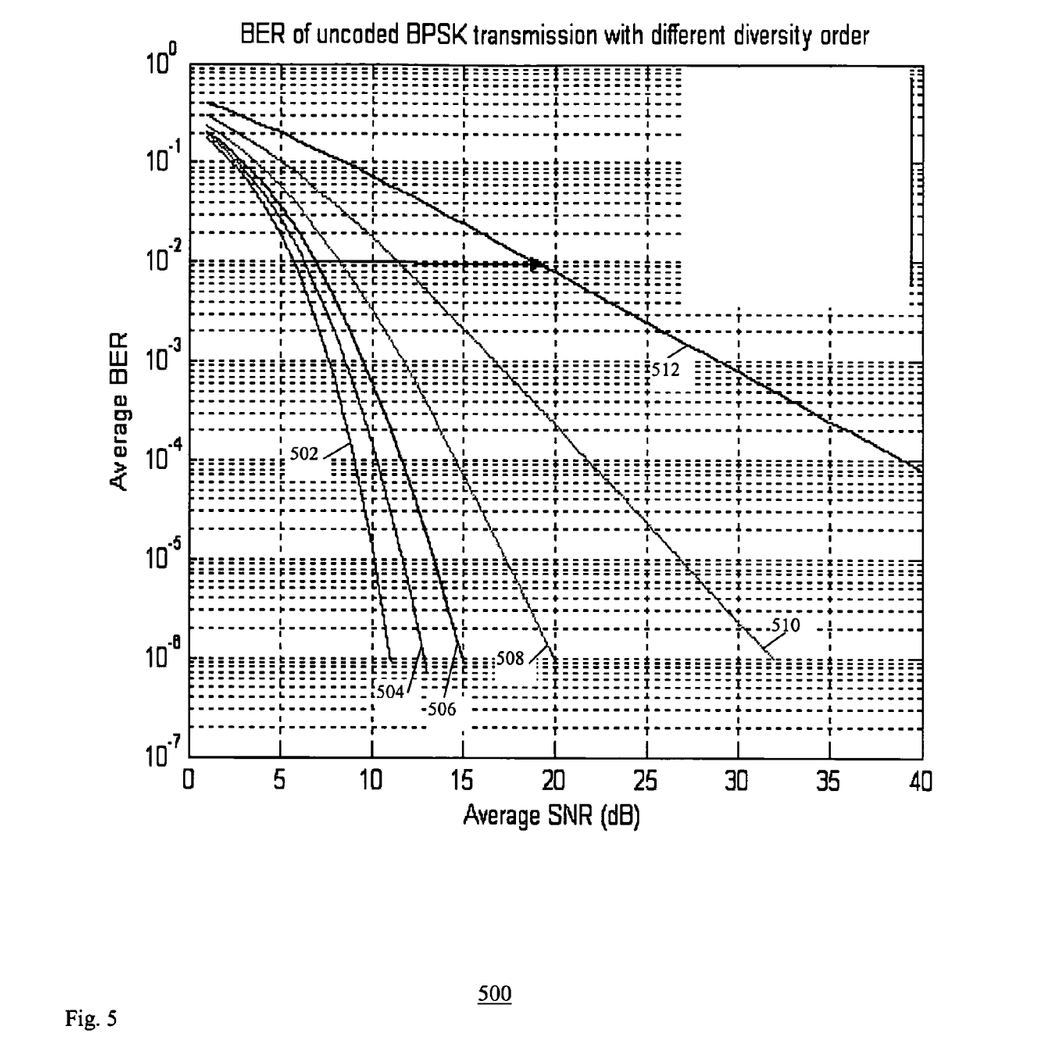
FIG. 5 shows effect of diversity order on fading performance according to an embodiment of the present invention.

Step 404: Calculate the equivalent SNR in the calculator 368 according to the different diversity orders. The required SNR values provided in Table I present AWGN performance which corresponds to the case of infinite diversity order. For a fading channel, the performance will be worse compared to AWGN channel. The set of curves 500 in FIG. 5 shows the effect of diversity order on BER (bit error rate) of uncoded BPSK (biphase shift keying) transmission, according to an embodiment of the present invention. The curve 502 shows the AWGN performance which corresponds to the diversity (d) of infinity diversity order. The remaining curves 504, 506, 508, 510, 512 show the performance degradation with the decrease of the diversity order for d=16, d=8, d=4, d=2, d=1, respectively. The curve 512 corresponds to d=1 case which gives the worse performance.

It can be easily seen from FIG. 5 that the diversity performance improves with higher diversity order. When diversity gain d=1, this corresponds to the Rayleigh fading channel. We further build the backoff table as shown in Table II below:

TABLE II

An example of back-off based on diversity order

| Diversity Order | Back-off (dB) |
|---|---|
| 1 | 12 |
| 2 | 7 |
| 3 | 3 |
| 4 | 2 |
| 5 and up | 1 |

For example, for a 4×4 (i.e., 4 transmit antennas and 4 receive antennas) system, the power of each eigen-mode transmission is calculated based on the corresponding eigen-values as 25 dB, 23 dB, 20 dB and 17 dB. The diversity order of each eigen-mode is 16, 9, 4, 1 based on the Theorem above. Compared with Table II, we get the equivalent SNR for each eigen-mode as 24 dB, 22 dB, 18 dB and 5 dB, respectively.

The equivalent SNR is the eigen-mode power minus the back-off. The back-off SNR is defined in Table II. For example, for the first eigen-mode, the equivalent power is 25−1 (diversity=16, so 1 dB backoff)=24 dB. Similarly, we get 23−1 (diversity=9, so 1 dB backoff)=22 dB for the second eigen-mode, 20−2 (diversity=4, so 2 dB back-off) for the third eigen-mode, 17−12 (diversity=1, so 12 dB back-off) for the fourth eigen-mode, etc.

Table II is a typical example, according to the present invention, based on the BPSK performance. As those skilled in the art will recognize, in other implementations according to the present invention, Table II can be adjusted to more optimized numbers based on more testing and averaging across all constellation types.

Step 405: Select the highest possible data rate based on the equivalent SNR using Table I. For example, we get the equivalent SNR for the first eigen-mode as 15 dB, and our target PER (packet error rate) is 1%, then we select 64QAM (quadrature amplitude modulation) with ½ coding rate for transmission. In "TGnSync Proposal Technical Specification," IEEE 802.11 document # 11-04-0889-07-000n (incorporated herein by reference), the coding rate is further constrained to be the same for all spatial streams. In this case, according to the present invention we select the highest possible transmission rate for the first spatial stream and fix the coding rate. For the reminding spatial streams, we choose the highest possible data rate with the same coding rate as the first stream.

Step 406: Check the MCS index for the selected coding and modulation scheme. Feedback the MCS index to the transmitter using MFB (MCS Feedback) MAC control frame.

Improved MCS Selection Based On Channel Delay Profile

The above rate adaptation method according to an embodiment of the present invention (e.g., FIG. 4C), presents an MCS selection scheme for eigen-beamforming using the mean of the eigen-values and the diversity order of each eigen-mode. That method can be further improved if the receiver has the capability of detecting the channel delay profile. Detecting channel delay profile is required for the optional feature of using half GI (Guard Interval).

For systems that support half GI optional mode, the channel delay information can be used to further optimize the system performance. For half GI, the cyclic delay is 400 ns. For full GI, the cyclic delay is 800 ns. The guard interval is used to protect the inter symbol interference, which is cause by the multipath in the fading channel. If the multipath is not severe, i.e., the channel delay is small, half GI can be used for higher throughput.

The steps of in flowchart of FIG. 4C still apply, two sets of back-off tables based on diversity order and channel delay profile are used. An example is shown in Table III and Table IV below. Again, as those skilled in the art will recognize, the detailed values in the tables can be further optimized based on more testing and averaging over all constellations. As such, in this embodiment determining the backoff values for different diversity order is based on testing and averaging across all constellation types.

TABLE III

Example back-off with long channel delay profile (Full GI system)

| Diversity Order | Back-off (dB) |
|---|---|
| 1 | 12 |
| 2 | 7 |
| 3 | 3 |

TABLE III-continued

Example back-off with long channel delay profile (Full GI system)

| Diversity Order | Back-off (dB) |
|---|---|
| 4 | 2 |
| 5 and up | 1 |

TABLE IV

Example back-off with short channel delay profile (Half GI system)

| Diversity Order | Back-off (dB) |
|---|---|
| 1 | 6 |
| 2 | 3 |
| 3 | 2 |
| 4 | 1 |
| 5 and up | 0 |

Further, the values in Tables II, III and IV can depend on the detailed implementation of each system. The SNR can be calculated using the mean of the eigen-values across all sub-carriers. The SNR can also use the post-detection SNR of each data stream which is the output of the linear MMSE detector 360 (FIG. 4B).

As such, the present invention provides a novel method to select different transmission modes for each MIMO OFDM transmission. Such a method is a simple, fast and efficient scheme to select the transmission rate for each eigen-mode.

The present invention has been described in considerable detail with reference to certain preferred versions thereof; however, other versions are possible. Therefore, the spirit and scope of the appended claims should not be limited to the description of the preferred versions contained herein.

What is claimed is:

1. A signaling method over multiple channels in a wireless telecommunication systems including a transmitter and receiver, comprising:
   obtaining an information bit stream;
   selecting number of transmission streams;
   selecting different transmission rates based on diversity order of each eigen-mode for each MIMO (multiple-input-multiple-output) OFDM (orthogonal frequency division multiplexing) transmission;
   performing back-off for a SNR (signal to noise ratio) requirement corresponding to the diversity order, wherein back-off decreases as the diversity order of each eigen-mode increases;
   computing a back-off table based on diversity order as:

| Diversity Order | Back-off (dB) |
|---|---|
| 1 | 12 |
| 2 | 7 |
| 3 | 3 |
| 4 | 2 |
| 5 and up | 1; and | transmitting the information bit stream for the transmitter via said multiple channels over a plurality of transmitter antennas to the receiver according to the selected transmission rate per channel.

2. The method of claim 1, wherein the selecting different transmission rates further includes selecting the transmission rates based on diversity order of each stream.

3. The method of claim 2 wherein the selecting different transmission rates further includes:
computing a transmission rate table for SISO (single input, single output) AWGN (additive white Gaussian noise) channel; and
determining average power.

4. The method of claim 3 wherein the determining the average power comprises determining a mean value of the eigen-values for each eigen-mode.

5. The method of claim 2, wherein:
the telecommunication system includes $N_{tx}$ transmit antennas and $N_{rx}$ receive antennas, and
the diversity order of each eigen-mode transmission in beamforming is given by $(N_{tx}-i)(N_{rx}-i)$, where $i= 0, \ldots, \min(N_{tx}, N_{rx})-1$ are the indices corresponding to largest eigen-mode to smallest eigen-mode.

6. The method of claim 2 wherein the selecting different transmission rates further includes using the diversity order of each stream to select the corresponding transmission rate for each eigen-mode.

7. The method of claim 6 wherein power of each eigen-mode transmission is calculated based on corresponding eigen-values.

8. The method of claim 7 wherein the selecting different transmission rates further includes:
computing a transmission rate table for SISO (single input, single output) AWGN (additive white Gaussian noise) channel; and
determining average power of each eigen-mode across all subcarrier.

9. The method of claim 8, wherein the selecting different transmission rates further includes:
computing a transmission rate table for SISO AWGN channel providing required SNR for different MCS (modulation coding scheme) in AWGN channels;
for each MRQ (MCS request), estimating channel knowledge using a sounding packet;
calculating average eigen-values for each eigen-mode across all subcarriers;
determining the diversity order of each eigen-mode, and calculating equivalent SNR by back-off from the average eigen-values according to the diversity order;
selecting the highest transmission rate possible based on the equivalent SNR for the each eigen-mode; and
feeding back an MCS selection using MFB (MCS feedback).

10. The method of claim 6, wherein the selecting different transmission rates further includes selecting different transmission modes for each MIMO OFDM transmission using rate adaptation with extended MOS (modulation coding scheme) set for wideband eigen-beamforming transmission.

11. The method of claim 8 further including:
the receiver detecting The channel delay profile,
wherein the selecting different transmission rates further includes performing back-off for the SNR requirement corresponding to the diversity order and channel delay profile.

12. The method of claim 11 further including:
based on a detected channel delay profile, using a half guard interval in the transmitter,
wherein the selecting different transmission rates further includes determining two sets of back-off tables based on diversity order and channel delay profile, to perform back-off for the SNR requirement corresponding to the diversity order and channel delay profile.

13. A wireless communication system, comprising:
a wireless transmitter that transmits data streams via multiple channels over a plurality of antennas to a receiver, the system including a controller that selects different transmission modes based on diversity order of each eigen-mode for each MIMO (multiple-input-multiple-output) OFDM (orthogonal frequency division multiplexing) transmission, and performs back-off for a SNR (signal to noise ratio) requirement corresponding to the diversity order, wherein back-off decreases as the diversity order of each eigen-mode increases, and the controller further computes a back-off table based on diversity order as:

| Diversity Order | Back-off (dB) |
| --- | --- |
| 1 | 12 |
| 2 | 7 |
| 3 | 3 |
| 4 | 2 |
| 5 and up | 1. |

14. The system of claim 13, wherein the transmitter transmits said multiple channels over a plurality of transmitter antennas to the receiver according to selected transmission rate per channel.

15. The system of claim 14, wherein the controller selects the transmission rate based on the diversity order of each stream.

16. The system of claim 15 wherein the controller further computes a transmission rate table for SISO (single input, single output) AWGN (additive white gaussian noise) channel, determines average power.

17. The system of claim 16 wherein the controller determines the average power by determining mean value of eigen-values for each eigen-mode.

18. The system of claim 15, wherein:
the system includes $N_{tx}$ transmit antennas and $N_{rx}$ receive antennas, and the diversity order of each eigen-mode transmission in beamforming is based on $(N_{tx}-i)(N_{rx}-i)$, where $I=0, \ldots, \min(N_{tx}, N_{rx})-1$ are the indices corresponding to largest eigen-mode to smallest eigen-mode.

19. The system of claim 15 wherein the controller further uses the diversity order of each stream to select a corresponding transmission rate for each eigen-mode.

20. The system of claim 19 wherein the controller calculates power of each eigen-mode transmission based on corresponding eigen-values.

21. The system of claim 20 wherein the controller further:
computes a transmission rate table for SISO (single input, single output) AWGN (additive white Gaussian noise) channel; and
determines average power of each eigen-mode across all subcarriers.

22. The system of claim 20 wherein the controller further:
computes the transmission rate table for SISO AWGN channel providing required SNR for different MCS (modulation coding scheme) in AWGN channels, for each MRQ (MOS request) estimates channel knowledge using a sounding packet, calculates average eigen-values for each eigen-mode across all subcarriers, determines the diversity order of each eigen-mode, and calculates an equivalent SNR by back-off from the average eigen-values according to the diversity order, selects a highest transmission rate possible based on the equivalent SNR for the each eigen-mode, and feeds back an MOS selection using MFB (MCS feedback).

23. The system of claim 19 wherein the controller selects different transmission mode for each MIMO OFDM transmission using rate adaptation with extended MCS (modulation coding scheme) set for wideband eigen-beamforming transmission.

24. The system of claim 22 wherein the receiver detects a channel delay profile, and the controller selects the transmission rate by further performing back-off for the SNR requirement corresponding to the diversity order and the channel delay profile.

25. The system of claim 24 wherein, based on detected channel delay profile, the transmitter uses a half guard interval, and the controller selects the transmission rate by further determining two sets of back-off tables based on diversity order and channel delay profile, to perform back-off for the SNR requirement corresponding to the diversity order and channel delay profile.

26. The system of claim 13 wherein the transmitter and receiver perform MIMO OFDM wireless communication.

* * * * *